(12) United States Patent  (10) Patent No.: US 7,835,318 B2
Calcagno et al.  (45) Date of Patent: Nov. 16, 2010

(54) RADIOTELEPHONY NETWORK WITH MULTI-CARRIER PACKET DATA TRANSMISSION

(75) Inventors: Andrea Calcagno, Francavilla Marittima (IT); Enrico Buracchini, Turin (IT)

(73) Assignee: Telecom Italia S.p.A., Milan (IT)

( * ) Notice: Subject to any disclaimer, the term of this patent is extended or adjusted under 35 U.S.C. 154(b) by 134 days.

(21) Appl. No.: 10/553,951

(22) PCT Filed: Apr. 23, 2003

(86) PCT No.: PCT/IB03/01502

§ 371 (c)(1),
(2), (4) Date: Oct. 21, 2005

(87) PCT Pub. No.: WO2004/095792

PCT Pub. Date: Nov. 4, 2004

(65) Prior Publication Data

US 2007/0008917 A1  Jan. 11, 2007

(51) Int. Cl.
*H04W 4/00* (2009.01)
*H04W 36/04* (2009.01)

(52) U.S. Cl. .................... 370/328; 370/331; 455/437

(58) Field of Classification Search ............. 370/206, 370/208, 328–331, 343–345, 338; 455/449–450, 455/437, 444, 432.1
See application file for complete search history.

(56) References Cited

U.S. PATENT DOCUMENTS

| | | | | |
|---|---|---|---|---|
| 5,870,392 A | * | 2/1999 | Ann ........................... | 370/335 |
| 6,163,694 A | * | 12/2000 | Lind et al. ................ | 455/435.3 |
| 6,256,500 B1 | * | 7/2001 | Yamashita ................. | 455/441 |
| 6,456,847 B1 | * | 9/2002 | Lilja et al. .................. | 455/437 |
| 6,546,251 B1 | | 4/2003 | Dalsgaard et al. | |
| 6,940,827 B2 | * | 9/2005 | Li et al. ...................... | 370/278 |

(Continued)

FOREIGN PATENT DOCUMENTS

EP     0 984 654     3/2000

(Continued)

OTHER PUBLICATIONS

ETSI SMG#24, SMG2: "Summary of the Concept Description of the Beta Concept", UMTS 30.06 Version 3.0.0, TR 101 146 V.3.0.0, XP002250655, pp. 175-185, (1997).

(Continued)

*Primary Examiner*—Kwang B Yao
*Assistant Examiner*—Candal Elpenord
(74) *Attorney, Agent, or Firm*—Finnegan, Henderson, Farabow, Garrett & Dunner, LLP

(57) ABSTRACT

A radio telephony network supports at least one link of a radio channel for a packet data transmission service. The radio telephony network has a plurality of network controllers. Each network controller is connected, via an interface to at least one base radio station supervising at least one macrocell. The radio telephony network additionally has at least one base radio microstation connected to the network controller via an interface of the same type as that connecting the base radio station to the controller. The base radio microstation supervises at least one microcell incorporated in at least one macrocell. The base radio microstation provides the packet data transmission service in the microcell on the link of the radio channel, preferably using multicarrier radio access. The multi-carrier radio access is preferably of the OFDM type.

21 Claims, 3 Drawing Sheets

U.S. PATENT DOCUMENTS

| | | | |
|---|---|---|---|
| 6,983,333 B2* | 1/2006 | Haberland | 709/250 |
| 7,043,242 B2* | 5/2006 | Kuiri et al. | 455/436 |
| 7,151,933 B2* | 12/2006 | Chen et al. | 455/437 |
| 7,155,229 B2* | 12/2006 | Dent | 455/450 |
| 7,352,768 B2* | 4/2008 | Lohtia et al. | 370/437 |
| 7,499,705 B2* | 3/2009 | Rimoni et al. | 455/436 |
| 2002/0009998 A1* | 1/2002 | Reemtsma | 455/449 |
| 2002/0105932 A1* | 8/2002 | Miya | 370/338 |
| 2003/0054807 A1* | 3/2003 | Hsu et al. | 455/414 |
| 2004/0077349 A1* | 4/2004 | Barak et al. | 455/436 |
| 2004/0203788 A1* | 10/2004 | Fors et al. | 455/439 |
| 2005/0009531 A1* | 1/2005 | Lindquist et al. | 455/452.2 |

FOREIGN PATENT DOCUMENTS

| | | |
|---|---|---|
| EP | 1 175 116 | 1/2002 |
| WO | WO 01/99466 | 12/2001 |
| WO | WO 02/073831 | 9/2002 |

OTHER PUBLICATIONS

Vogiatzis et al., "An Adaptive Multicarrier Wireless Access System", IEEE, vol. 1, XP010532513, pp. 298-303, (2000).

Nortel Networks, Wawecomm, France Telecom: "Stand Alone DSCH Principles and Benefits", TSGR1#19(01)0290, TSG-RAN Working Group 1, Meeting #19, XP002250656, 3 pages, (2001).

Harri Holma, Antti Toskala: "WCDMA for UMTS", John Wiley & Sons, Ltd., pp. 121-127, XP002250657, pp. 66-67, (2000).

"Reference OFDM Physical Layer Configuration", Nortel Networks, 3GPP TSG RAN1 Meeting #28 bis, Espoo, Finland, pp. 1-13, (2002).

ETSI TS 123 107 V3.5.0 Universal Mobile Telecommunications System (UMTS); QoS Concept and Architecture (3GPP TS 23.107 version 3.5.0 Release 1999), Dec. 2000.

* cited by examiner

RADIOTELEPHONY NETWORK WITH MULTI-CARRIER PACKET DATA TRANSMISSION

CROSS REFERENCE TO RELATED APPLICATION

This application is a national phase application based on PCT/IB2003/001502, filed Apr. 23, 2003, the content of which is incorporated herein by reference.

The present invention relates generally to the field of radio telephony and particularly to a radio telephony network, for example a third generation radio telephony network. More particularly, the present invention relates to a third generation radio telephony network with packet data transmission provided by a multi-carrier tecnique such as OFDM ("Orthogonal Frequency Division Multiplexing").

Known radio telephony systems such as GSM are essentially intended for voice communication. They use two symmetrical links, namely a downlink (from a terrestrial base station to a mobile station) and an uplink (from a mobile station to a base station).

The systems under development are also based on a structure of this type. Thus, the UMTS standard issued by ETSI provides for two symmetrical links, one for uplink and one for downlink.

One of the problems to be faced by radio telephony in the forthcoming years is the presence of new services and new applications requiring very high speed data transmission.

Recent studies have shown that the resources allocated to the transmission of data (files, sounds, fixed or animated images), particularly via Internet or other similar networks, will form the predominant part of the resources available from the year 2005 onwards, while the resources allocated to voice communication are expected to remain practically constant.

WO 99/53644 describes the transmission of a cellular radio telephone signal via a symmetrical two-way main channel, including a main uplink and a main downlink, in particular for data transmission at medium or low speed and for the transmission of signaling information and control data, and comprising at least one additional channel assigned solely to the downlink for high-speed data transmission.

The main channel uses a code division access method (CDMA), while the supplementary channel uses a multi-carrier technique.

The multi-carrier technique is implemented by the simultaneous transmission of carrier frequencies (using the OFDM technique for example).

In particular, said supplementary channel uses the "IOTA" modulation technique.

Additionally, the document R1-02-1222, Reference OFDM Physical Layer Configuration, Nortel Network, 3GPP TSG RAN1 Meeting#28bis, Espoo, Finland, Oct. 8-9, 2002 (associated slides R1-02-12) describes an example reference OFDM configuration which may be considered to evaluate the performance of OFDM in the framework of the SI ("Study Item") on OFDM introduction in UTRAN. This OFDM configuration assumes the use of a separate downlink carrier bearing an OFDM HS-DSCH (High Speed-Downlink Shared Channel) transmission or an OFDM DSCH (Downlink Shared Channel) transmission.

The Applicant faced the problem of making a radio telephony network capable of providing a high-speed packet data transmission service in areas where high traffic is expected.

The Applicant has observed that the problem described above can be solved with a radio telephony network supporting at least one link of a radio channel for a packet data transmission service. The radio telephony network comprises a plurality of network controllers RNC, each connected via an $I_{ub}$ interface to at least one base radio station supervising at least one macrocell. The radio telephony network also comprises at least one base radio microstation, connected to the network controller via an $I_{ub}$ interface of the same type as that connecting the base radio station to the network controller RNC. Each base radio microstation supervises one or more microcells 5b incorporated in at least one macrocell served by the base radio station. The microcells are centered at points different from the center of the macrocell, where the "center of the macrocell" denotes the point at which the base radio station is located. The microcells correspond to areas where high traffic is expected (known as "hot spots"), such as airports, stadium, small urban centers, hotels, commercial centers etc. (outdoor environments) or buildings etc. (indoor office environments) in which the base radio microstations provide the packet data transmission service via the link of the radio channel, preferably using multi-carrier radio access. The multi-carrier radio access is preferably of the OFDM type. The link of the radio channel is preferably the downlink.

According to the present invention, it is therefore provided a radio telephony network supporting at least one link of a radio channel for a packet data transmission service. The radio telephony network comprises a plurality of network controllers RNC, each network controller RNC being connected, via an $I_{ub}$ interface, to at least one base radio station supervising at least one macrocell. The radio telephony network is characterized in that it additionally comprises at least one base radio microstation, connected to the network controller RNC via an $I_{ub}$ interface of the same type as that connecting the base radio station to the network controller RNC. The base radio microstation supervises at least one microcell incorporated in at least one macrocell. This microcell is centered at a point different from the point at which the macrocell is centered. The base radio microstation provides said packet data transmission service via at least one link of the radio channel.

In particular, the base radio microstation provides the packet data transmission service by means of a multi-carrier radio access. Said multi-carrier radio access is preferably of the OFDM type. Said link of the radio channel is preferably the downlink.

According to another aspect of the present invention, each base radio microstation comprises a central switch and a plurality of access ports connected to said central switch by a cable.

Specifically, each base radio microstation comprises a protocol structure including a first protocol level and a second protocol level located above said first protocol level, said first protocol level L1 being a physical level and said second protocol level L2 being a data transmission level.

The first protocol level L1 includes circuit components for processing a multi-carrier radio signal formed by a plurality of radio carriers associated with data to be transmitted. Said circuit components for processing said multi-carrier radio signal comprise dedicated circuits and/or programmable DSPs.

The data transmission level comprises an access control sub-level MAC including an entity MAC-OFDM for controlling said multi-carrier radio access. The logical entity MAC-OFDM maps logical channels on the transport channels, implements functions of retransmission of incorrectly received data packets, and implements scheduling functions.

The access control sub-level MAC of each base radio microstation also comprises a frame protocol OFDM-FP for controlling the transport of the multi-carrier radio signal between the base radio microstation and the network controller RNC connected to it.

Advantageously, the central switch comprises the logical entity MAC-OFDM and the frame protocol OFDM-FP, in which each of the access ports AP comprises said first protocol level including said circuit components for processing said one multi-carrier radio signal.

Additionally, each network controller RNC comprises an access control sub-level MAC including a frame protocol OFDM-FP for controlling the transport of the multi-carrier radio signal within said network controller RNC or between said network controller RNC and the base radio microstation connected to it.

Furthermore, the base radio microstation can provide said packet data transmission service to at least one user equipment UE located in the microcell served by the base radio microstation.

Advantageously, the user equipment UE comprises a protocol structure including a physical level comprising circuit components for demodulating the multi-carrier radio signal.

The characteristics and advantages of the present invention will be made clear by the following description of an example of embodiment provided for guidance and without restrictive intent, with reference to the attached drawings, in which.

Figure 1:
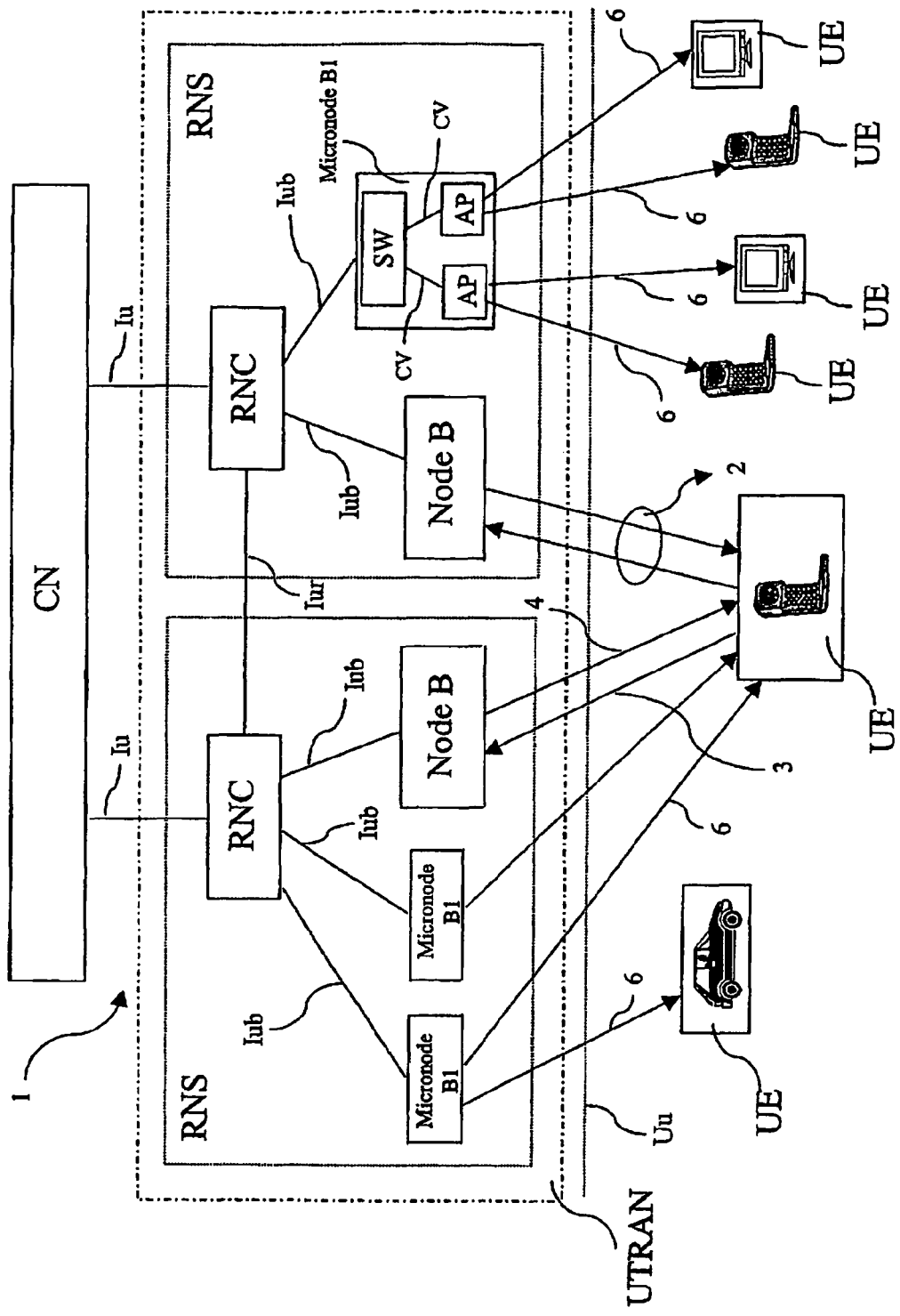
FIG. 1 is a schematic representation of a radio telephony network according to the invention.

FIG. 1 shows a third-generation radio telephony network 1, made according to the invention. The radio telephony network 1 has a main radio access of the CDMA type on a main radio channel 2 comprising two symmetrical links, namely a main uplink 3 (uplink) and a main downlink 4 (downlink), both, for example, with a 5 MHz bandwidth. The radio telephony network 1 also supports a multi-carrier radio access on at least one link of a supplementary radio channel 6 to provide a packet data transmission service.

The supplementary radio channel 6, for example with a 5 MHz bandwidth, can be located within the radio frequency band assigned to third-generation systems. These radio frequencies form a "core" band of 230 MHz in the 1885÷2025 MHz and 2210÷2200 MHz portions of the spectrum. Alternatively, the supplementary radio channel 6 could be located in an extension of the aforesaid band. In this case, the 800÷960 MHz, 1700÷1885 MHz and 2500÷2690 MHz portions of the spectrum, for example, have been identified.

The radio telephony network 1 comprises the following logical entities:

Core Network CN;
radio access network UTRAN (UMTS Terrestrial Radio Access Network);
user equipment UE.

More specifically, the Core Network CN, made according to the 3GPP specifications, is a switching and routing infrastructure interconnecting the various sections of the radio access network UTRAN which, in turn, directly collects the traffic from a plurality of base radio stations, referred to below as B-nodes, connected to the user equipment UE (for example cell phones, vehicles, electronic computers, etc.) via the main radio channel 2.

As shown in FIG. 1, the radio access network UTRAN is delimited by two interfaces, namely a radio interface called $U_u$ delimiting the radio access network UTRAN towards the user equipment UE and a network interface $I_u$ connecting the radio access network UTRAN to the Core Network CN.

Figure 2:
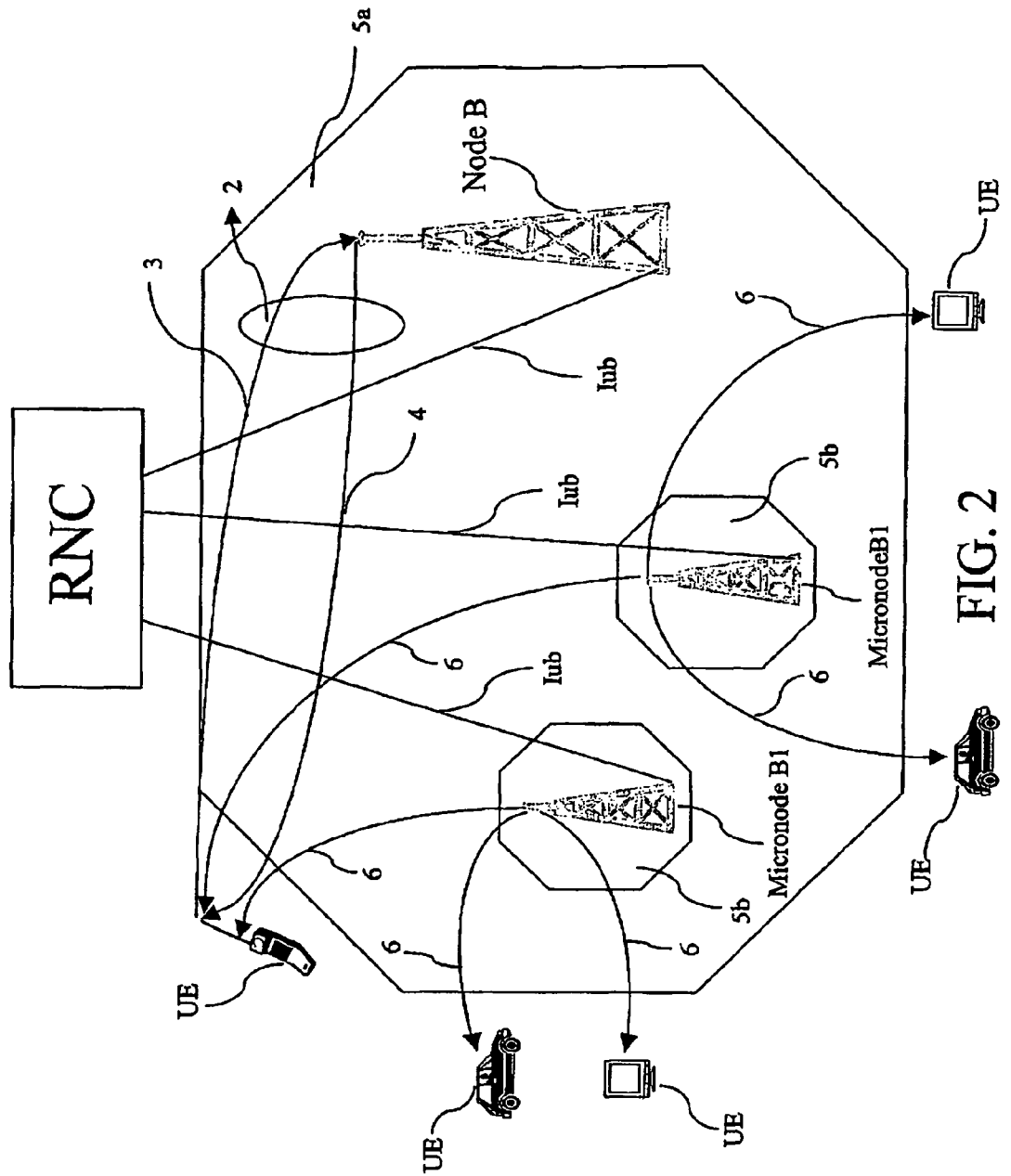
FIG. 2 shows a distribution of base radio microstations of the radio telephony network of FIG. 1.

In detail, the radio access network UTRAN comprises a plurality of radio sub-systems RNS (Radio Network System) connected to the Core Network CN via the network interface $I_u$. Each radio sub-system RNS includes a network controller RNC (Radio Network Controller) representing the boundary between the radio portion and the remaining network, and one or more B-nodes, connected to the network controller RNC via an interface $I_{ub}$. Each B-node, made according to the 3GPP specifications, supervises one or more macrocells 5a, as shown in FIG. 2. Additionally, the network controllers RNC can be interconnected by means of an interface $I_{ur}$.

With reference to FIGS. 1 and 2, according to the invention, the radio telephony network 1 also comprises one or more base radio microstations, referred to below as B1-micronodes, connected to the network controllers RNC via an interface $I_{ub}$ of the same type as that connecting the B-nodes to the corresponding network controllers RNC. Each B1-micronode supervises one or more microcells 5b comprised in at least one macrocell 5a served by the B-node. The microcells 5b are centred at points different from the center of the macrocell 5a, where the "center of the macrocell 5a" denotes the point at which the base radio station (B-node) is located. In particular, the microcells 5b correspond to areas where high traffic is expected (known as "hot spots"), such as airports, stadium, small urban centers, hotels, commercial centers etc. (outdoor environments) or buildings etc. (indoor office environments) in which the B1-micronodes provide the packet data transmission service. The B1-micronodes support at least one link of the supplementary radio channel 6 for the packet data transmission service, using a multi-carrier radio access, preferably of the OFDM type.

Preferably, in indoor office environments characterized by confined spaces, each B1-micronode can be made by a central switch SW, connected to the corresponding network controller RNC, and a plurality of access ports AP connected to the central switch SW by a cable $C_v$ which also supplies the power.

Functionally, each network controller RNC controls the radio resources and controls the radio transport, while each B-node/B1-micronode has the task of implementing the radio transmission (modulation, reception and transmission, power control) for carrying the information to the user equipment UE which is located in the macrocells 5a/microcells 5b.

In practice, each B-node/B1-micronode receives from the network controller RNC connected to it the resources to send to the user equipments UE and transmits them over the air, adjusting their power levels according to information received from said network controller RNC. At the same time, the B-node/B1-micronode carries out power and quality measurements on user equipment UE received signals for enabling the network controller RNC to adjust its parameters in the management of the radio resources.

In particular, the B1-micronodes also have specific functions relating to the protocol levels MAC and RLC which are described in detail in the remainder of the present description.

The system described above enables the user equipment UE to receive services supplied by the radio telephony network 1 even if they are supplied by B-nodes/B1-micronodes belonging to network controllers RNC other than the original network controller of the call. This enables the mobility of the user equipment UE to be managed efficiently by the network controllers RNC.

In particular, the packet data transmission provided by the B1-micronodes in the microcells 5b can reach a speed of 3÷24 Mb/s, for example, depending on the type of modulation and signal coding used. Thus the user equipments UE located within the microcells 5b can access, for example, Internet or other similar networks by directly using the radio telephony network 1, the B1-micronodes being connected directly to the network controllers RNC.

To allow access to this functionality, the user equipment UE supports both CDMA radio access and multi-carrier radio access. This is because the request of the packet data transmission service and both the allocation of the radio resources and the dialog with the uplink 3 in the call establishment phase and during the course of the service, take place by means of the CDMA radio access.

Figure 3:
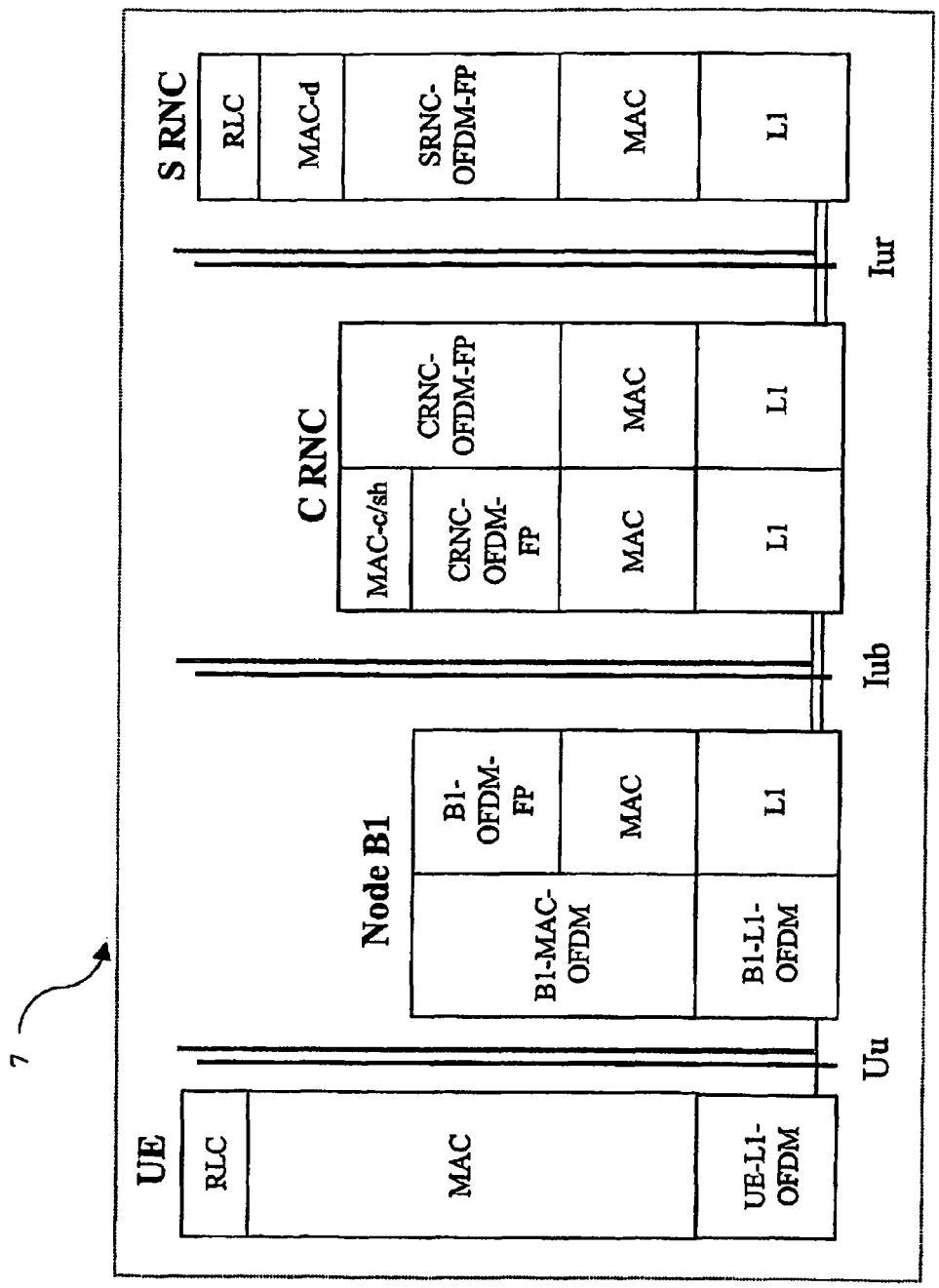
FIG. 3 is a schematic representation of a protocol structure of a portion of the radio telephony network of FIG. 1.

FIG. 3 shows schematically the protocol structure of a portion 7 of the radio telephony network supporting, on a downlink of the supplementary channel 6, the packet data transmission providing by means of a multi-carrier tecnique, preferably of the OFDM type. Specifically, in the multi-carrier tecnique the data are transmitted by means of radio signals comprising a plurality of carrier frequencies transmitted simultaneously.

The radio telephony network 1 also has a conventional protocol structure for reception and transmission according to the main CDMA radio access.

The network portion 7 comprises the user equipment UE protocols, the radio interface $U_u$, the B1-micronode protocols, the interface $I_{ub}$, the network controller RNC protocols and the interface $I_{ur}$.

FIG. 3 also shows two different operating modes of the network controller RNC, called Controlling RNC (C RNC) and Serving RNC (S RNC) respectively, as specified in 3GPP.

In particular, in the "controlling" mode the network controller RNC controls the traffic and the congestion situations of its own cells and terminates the interface $I_{ub}$, while in the "serving" mode the network controller RNC controls and manages the resources of the user equipment UB and terminates the interface $I_u$.

As shown in FIG. 3, the protocol structure of the network portion 7 includes the first two levels of the OSI (Open System Interconnection) protocol stack, namely:
the physical level L1;
the data transmission level L2 (Data Link).

Additionally, the data transmission level L2 is divided into two sub-levels, namely an access control sub-level MAC (Medium Access Control) and a transmission control sub-level RLC (Radio Link Control).

In particular, the physical level L1 offers services to the access control sub-level MAC in the form of transport channels.

The access control sub-level MAC controls the simultaneous accesses of a plurality of user equipments UE (multiple access) to the available radio resources, and offers services to the transmission control sub-level RLC via logical channels characterized by the type of data transmitted.

The transmission control sub-level RLC controls the transmission of the information within the access network UTRAN, also offering a retransmission service for those packets which the physical level L1 has been unable to deliver successfully to their destinations.

With further reference to FIG. 3, the user equipment UE comprises, from the bottom to the top, the physical level UE-L1-OFDM comprising circuit components for demodulating a multi-carrier radio signal, preferably of the OFDM type; the access control sub-level MAC; and the transmission control sub-level RLC.

The B1-micronode comprises, from the bottom to the top, the physical level L1 and the access control sub-level MAC.

In greater detail, the physical level L1 of the B1-micronode next to the radio interface $U_u$ comprises a portion B1-L1-OFDM made from circuit components, such as dedicated circuits and/or programmable DSPs, which can process the multi-carrier radio signal, preferably of the OFDM type (channel coding, interleaving, transmission speed adaptation, modulation). The access control sub-level MAC includes the logical entity B1-MAC-OFDM, located above the portion B1-L1-OFDM and below a logical entity MAC-c/sh present in the network controller RNC operating in "controlling" mode. The logical entity MAC-c/sh of the network controller RNC controls the common and shared channels, while the logical entity B1-MAC-OFDM of the B1-micronode controls the multi-carrier radio access, preferably of the OFDM type. In particular, the logical entity B1-MAC-OFDM maps the logical channels on the transport channels and also implements functions of a HARQ (Hybrid Automatic Repeat Request) protocol and functions of scheduling (a procedure which attempts to transmit only to the user equipment UE having favorable radio conditions). Specifically, the HARQ protocol controls the rapid request for retransmission of data packets which have not been correctly received, and also makes use of the information supplied by the incorrect data packets in order to achieve a correct decoding of said packets.

Additionally, the implementation of the scheduling functions within the B1-micronode provides greater efficiency in the execution of this procedure. This is because the scheduler can adapt the type of modulation to the conditions of the radio channel, transmitting only to the user equipment UE for which the radio conditions are good, and allocating the radio resources of the radio telephony network 1 with appropriate algorithms.

Advantageously, the introduction of the logical entity B1-MAC-OFDM enables the mobile operator to provide packet data transmission, preferably using the OFDM tecnique, without modifying the higher levels and protocols of the radio telephony network 1 (the transmission control sub-level RLC and the protocol PCDP-Packet Data Convergence, the latter being present in the network level, or level L3, of the radio telephony network 1).

Furthermore, the logical entity B1-MAC-OFDM enables the transmission control sub-level RLC to operate either in AM mode (OFDM transmission found) or in UM mode (OFDM transmission not found), and enables the protocol PDCP to be configured for header compression, if required.

Next to the interface $I_{ub}$, the access control sub-level MAC comprises a frame protocol B1-OFDM-FP controlling the transport of data between the B1-micronode and the network controller RNC connected to it.

If the B1-micronode is made by the central switch SW and the access ports AP, the central switch SW comprises the access control sub-level MAC, including the logical entity B1-MAC-OFDM located next to the radio interface $U_u$, and the frame protocol B1-OFDM-FP located next to the interface $I_{ub}$. Each of the access ports AP comprises the physical level L1 including the portion B1-L1-OFDM comprising the logic required for controlling the radio communication. In this way, practically all the computing capacity is moved into the central switch SW, thus minimizing the space occupied by the access ports AP.

With further reference to FIG. 3, the network controller RNC comprises, from the bottom to the top, the physical level L1 and the data transmission level L2.

In particular, in "controlling" mode the network controller RNC comprises, from the bottom to the top, the physical level L1 and the access control sub-level MAC. The access control sub-level MAC comprises the frame protocol CRNC-OFDM- FP which, on the side facing the interface $I_{ub}$ is located below the logical entity MAC-c/sh by the frame protocol B1-OFDM-FP of the B1-micronode, and which, on the side facing the interface $I_{ur}$, is located below a logical entity MAC-d present in the network controller RNC operating in "serving" mode. The logical entity MAC-d has the task of controlling the dedicated channels.

In "serving" mode, the network controller RNC comprises, from the bottom to the top, the physical level L1, the access control sub-level MAC and the transmission control sub-level RLC. The access control sub-level MAC comprises the frame protocol SRNC-OFDM-FP locating below the logical entity MAC-d by the frame protocol CRNC-OFDM-FP of the network controller RNC operating in "controlling" mode.

The frame protocol SRNC-OFDM-FP permits data transport within the network controller RNC (if the interface $I_{ur}$ is present) and direct dialog between the B1-micronode and the network controller RNC operating in "serving" mode (if the interface $I_{ur}$ is not present).

Functionally, a data packet entering the network controller RNC operating in "serving" mode is received by the transmission control sub-level RLC and, subsequently, by the logical entity MAC-d, and then enters the frame protocol SRNC-OFDM-FP and finally reaches B1-micronode via the frame protocol CRNC-OFDM-FP of the network controller RNC operating in "controlling" mode.

In the B1-micronode, the data packet passes through the frame protocol B1-OFDM-FP and is received by the logical entity B1-MAC-OFDM and subsequently by the physical level B1-L1-OFDM.

The data packet then passes through the radio interface $U_u$ and is received by the physical level UE-L1-OFDM of the user equipment UE and subsequently by the access control sub-level MAC and by the transmission control sub-level RLC, and then becomes visible to the user.

Advantageously, in the radio telephony network 1 according to the invention the updating of the B-nodes can also be provided, so that these nodes can support multi-carrier radio access, preferably of the OFDM type, on at least one link of the supplementary radio channel 6 to provide the packet data transmission service.

In general, each B-node has a protocol structure comprising the physical level L1 and the access control sub-level MAC.

In the updated B-node, in order to provide the packet data transmission service in a downlink of the supplementary channel 6, the physical level L1 comprises a portion B-L1-OFDM including circuit components, such as dedicated circuits and/or programmable DSPs capable of processing a multi-carrier radio signal, preferably of the OFDM type, while the access control sub-level MAC comprises the logical entity B-MAC-OFDM which is identical to the logical entity B1-MAC-OFDM described previously.

The advantages of the radio telephony network 1 according to the invention are evident from the above description. In particular, it is pointed out that this network can provide new business opportunities for the mobile operator in so-called "hot spots", since it is competitive with WLAN networks both in terms of the bit rate obtainable and in terms of ease of deployment; in the latter case, the B1-micronodes B1 are preferably made by the central switch SW and the access ports AP.

Additionally, if the radio telephony network 1 comprises both the updated B-nodes and the B1-micronodes it can offer the user the mobility functionalities provided by the radio sub-systems RNS; conversely, WLAN networks cannot offer this basic functionality.

The applicant has also observed that the above description relating to the downlink of the supplementary radio channel 6 can also be extended to an uplink of said radio channel. This is because the B1-micronode B1 made according to the present invention can be modified according to the teachings of the present invention to make it suitable for receiving and controlling any data packets transmitted by user equipment UE. Also in this case, the radio access can be of the multi-carrier type, preferably of the OFDM type.

The invention claimed is:

1. A radio telephony network supporting at least one link of a radio channel for a packet data transmission service, the network comprising:
    a plurality of network controllers, each network controller being connected via an interface to at least one base radio station, the at least one base radio station supervising at least one macrocell; and
    at least one base radio microstation connected to a network controller in the plurality of network controllers via an interface of the same type as that connecting the at least one base radio station to the network controllers, the at least one base radio microstation supervising at least one microcell incorporated in the at least one macrocell and centered at a point different from the point at which the at least one macrocell is centered, the at least one base radio microstation providing the packet data transmission service in the at least one microcell on the at least one link of the radio channel using a multi-carrier radio access, and the at least one base radio station providing the packet data transmission service in areas of the at least one macrocell other than in the at least one microcell,
    wherein at least one base radio station providing the packet data transmission service includes at least one protocol structure comprising a first set of protocol levels for transmitting packet data according to the base radio a first type of radio access used in the at least one macrocell and a second set of protocol levels for transmitting packet data according to the multi-carrier radio access used in the at least one microcell, the second set of protocol levels including a physical level and at least one protocol level located above the physical level for controlling the multi-carrier radio access, wherein the second set of protocol levels provides packet data transmission without modifying higher levels and protocols in the first set of protocol levels.

2. The network as claimed in claim 1, wherein said multi-carrier radio access is of the OFDM type.

3. The network as claimed in claim 1, wherein each base radio microstation comprises a central switch and a plurality of access ports connected to said central switch by a cable.

4. The network as claimed in claim 1, wherein each base radio microstation comprises a protocol structure including a first protocol level and a second protocol level located above said first protocol level, said first protocol level being a physical level and said second protocol level being a data transmission level.

5. The network as claimed in claim 4, wherein said first protocol level comprises circuit components for processing a multi-carrier radio signal, said multi-carrier radio signal being formed from a plurality of radio carriers associated with data to be transmitted.

6. The network as claimed in claim 5, wherein said circuit components for processing said multi-carrier radio signal comprise at least one of dedicated circuits and programmable DSPs.

7. The network as claimed in claim 4, wherein said data transmission level comprises an access control sub-level including a logical entity for controlling said multi-carrier radio access.

8. The network as claimed in claim 7, wherein said logical entity maps logical channels on transport channels.

9. The network as claimed in claim 7, wherein said logical entity implements functions of retransmission of incorrectly received data packets.

10. The network as claimed in claim 7, wherein said logical entity implements scheduling functions.

11. The network as claimed in claim 7, wherein said access control sub-level comprises a frame protocol for controlling the transport of said multi-carrier radio signal between said at least one base radio microstation and the network controller connected to it.

12. The network as claimed in claim 11, wherein a central switch comprises said logical entity and said frame protocol, the central switch being connected to a plurality of access ports and each access port comprises said first protocol level including said circuit components for processing said multi-carrier radio signal.

13. The network as claimed in claim 5, wherein each network controller comprises an access control sub-level, and a frame protocol for controlling the transport of said multi-carrier radio signal within said network controller or between said network controller and the base radio microstation connected to it.

14. The network as claimed in claim 5, wherein said at least one base radio microstation can provide said packet data transmission service to at least one user equipment located in the microcell served by said base radio microstation, said user equipment having a protocol structure including a physical level comprising circuit components for demodulating said multi-carrier radio signal.

15. The network as claimed in claim 1, wherein said at least one link of said radio channel is a downlink.

16. The network as claimed in claim 1, wherein the at least one microcell corresponds to a high traffic area within the at least one macrocell.

17. The network as claimed in claim 1, wherein the at least one link of the radio channel comprises at least one downlink.

18. The network as claimed in claim 17, wherein the at least one downlink supports orthogonal frequency division multiplexing.

19. A method of providing a packet data transmission service in a network, the network comprising at least one macrocell and at least one microcell located within the at least one macrocell, the method comprising:
   providing, using at least one base radio station in the at least one macrocell, the packet data transmission service using a first type of radio access;
   providing, using at least one base radio microstation in the at least one microcell, the packet data transmission service using a multi-carrier radio access different from the first type of radio access; and
   updating at least one base radio station providing the packet data transmission service from using the first type of radio access to using the multi-carrier radio access, wherein the updating occurs at the at least one base radio station and the at least one base radio station includes at least one protocol structure comprising a first set of protocol levels for transmitting packet data according to a first type of radio access used in the at least one macrocell and a second set of protocol levels for transmitting packet data according to the multi-carrier radio access used in the at least one microcell, the second set of protocol levels including a physical level and at least one protocol level located above the physical level for controlling the multi-carrier radio access, wherein the second set of protocol levels provides packet data transmission without modifying higher levels and protocols in the first set of protocol levels.

20. The method as claimed in claim 19, wherein the first type of radio access is CDMA radio access.

21. The method as claimed in claim 19, wherein the multi-carrier radio access is OFDM radio access.

* * * * *

UNITED STATES PATENT AND TRADEMARK OFFICE
CERTIFICATE OF CORRECTION

PATENT NO. : 7,835,318 B2
APPLICATION NO. : 10/553951
DATED : November 16, 2010
INVENTOR(S) : Andrea Calcagno et al.

Page 1 of 1

It is certified that error appears in the above-identified patent and that said Letters Patent is hereby corrected as shown below:

Claim 1, col. 8, line 37, delete "the base radio" after --according to--.

Signed and Sealed this
Twelfth Day of March, 2013

Teresa Stanek Rea
*Acting Director of the United States Patent and Trademark Office*